(12) United States Patent
Shaukat et al.

(10) Patent No.: US 9,993,117 B1
(45) Date of Patent: Jun. 12, 2018

(54) SHOWER DOOR ASSEMBLY

(71) Applicant: KLOZHER, LLC, Davie, FL (US)

(72) Inventors: Kasim Shaukat, Plantation, FL (US);
Saqib Shaukat, Davie, FL (US)

(73) Assignee: KLOZHER LLC, Davie, FL (US)

( * ) Notice: Subject to any disclaimer, the term of this patent is extended or adjusted under 35 U.S.C. 154(b) by 0 days. days.

(21) Appl. No.: 15/689,317

(22) Filed: Aug. 29, 2017

Related U.S. Application Data

(63) Continuation-in-part of application No. 14/033,034, filed on Sep. 20, 2013, now Pat. No. 9,743,809.

(60) Provisional application No. 61/703,325, filed on Sep. 20, 2012.

(51) Int. Cl.
*A47K 3/34* (2006.01)
*A47K 3/30* (2006.01)
*F16B 7/04* (2006.01)

(52) U.S. Cl.
CPC .............. *A47K 3/30* (2013.01); *F16B 7/0473* (2013.01); *A47K 2003/307* (2013.01)

(58) Field of Classification Search
CPC ....................................................... A47K 3/34
USPC .................................................... 4/605–608
See application file for complete search history.

(56) References Cited

U.S. PATENT DOCUMENTS

| | | | | |
|---|---|---|---|---|
| 3,054,118 A * | 9/1962 | Bullock | ..................... | E06B 3/50 4/607 |
| 3,359,573 A * | 12/1967 | Casebolt | ................... | A47K 3/34 4/607 |
| 4,520,608 A * | 6/1985 | Baus | ......................... | A47K 3/30 16/95 D |
| 4,594,742 A * | 6/1986 | Zeigler | ..................... | A47K 3/38 160/117 |
| 4,611,436 A * | 9/1986 | Williams | .................. | A47K 3/34 4/557 |
| 4,667,353 A * | 5/1987 | Zeigler | ..................... | A47K 3/38 160/117 |
| 5,822,810 A * | 10/1998 | Chen | ....................... | A47K 3/362 4/607 |
| 7,065,806 B2 * | 6/2006 | Reichel | ..................... | A47K 3/36 4/557 |
| 7,346,939 B2 * | 3/2008 | Perry | ........................ | A47K 3/34 4/557 |
| 7,900,318 B2 * | 3/2011 | Hanley | ..................... | A47K 3/34 16/87.4 R |
| 2003/0019030 A1 * | 1/2003 | Kopacz | ..................... | A47K 3/36 4/607 |
| 2011/0072577 A1 * | 3/2011 | Luedke | ..................... | A47K 3/34 4/607 |
| 2014/0259363 A1 * | 9/2014 | Ball | .......................... | A47K 3/34 4/607 |

* cited by examiner

*Primary Examiner* — Lori Baker
(74) *Attorney, Agent, or Firm* — Glenn E. Gold, P.A.; Glenn E. Gold; David Colls

(57) ABSTRACT

A shower door assembly for removable installation in a shower enclosure comprises a rail assembly including a rail and being adjustable along a longitudinal axis. The rail assembly defines at least one longitudinally aligned T-track in a bottom of said rail wherein the T-track is at least partially defined by two opposed shoulders. At least two carriage assemblies are received in the T-track and movable along the shoulders. A shower door is attached to and depends from the carriage assemblies.

11 Claims, 12 Drawing Sheets

SHOWER DOOR ASSEMBLY

CROSS-REFERENCE TO RELATED APPLICATION

This U.S. non-provisional patent application is a continuation-in-part of co-pending U.S. non-provisional patent application Ser. No. 14/033,034 (issuing on Aug. 29, 2017 as U.S. Pat. No. 7,743,809) having a filing date of Sep. 20, 2013, which, in-turn, claims the benefit of U.S. provisional patent application No. 61/703,325, having a filing date of Sep. 20, 2012. The entire contents of both of the aforementioned applications are incorporated-by-reference herein in their entireties.

FIELD OF THE INVENTION

The present disclosure generally relates to shower door assemblies, and more particularly, to a shower door and rail assembly for a shower enclosure wherein the shower door and rail assembly assembled and disassembled for use as part of a shower enclosure.

BACKGROUND OF THE INVENTION

People began showering to wash their bodies long before the introduction of modern or even early plumbing. Individuals would utilize natural geological formations in the form of waterfalls to rinse themselves clean. As a substitute ancient peoples reproduced this natural phenomenon by pouring jugs of water over themselves after washing. The first people to have constructed showers were the ancient Greeks. Their aqueducts and sewage systems, made of lead pipes, allowed water to be pumped both into and out of large communal shower rooms. The ancient Romans followed this convention with their famous bathhouses. Bathing fell out of practice once the Greek and Roman empires collapsed, and similar systems were not constructed until the latter part of the 19th century. Since that time, showers have become a popular inclusion as part of regular personal hygiene and are found in almost every home today.

Showers are either integrated with a bathtub or they are provided as standalone or built-in enclosures. Because of the spraying of water inherent in the use of a shower, there needs to be some means of retaining the water spray within the shower area. One known method of retaining the spray is by surrounding the shower area with a curtain, usually made from vinyl, cloth, or plastic. The purpose of the shower curtain is to both provide privacy for the individual showering and to prevent water from flooding or spraying outside of the shower area. Shower curtains usually surround the bath inside the tub or shower area, and they are supported by rails, or rods, mounted to the ceiling or supported between opposing bathroom walls.

Alternatively, instead of a curtain, shower doors may be installed to provide the same function as the shower curtain. Shower doors are doors used in bathrooms to help keep water inside a shower enclosure or a bathtub, and they are used as alternatives to shower curtains. Shower doors are available in many different styles such as framed or frameless doors, and the doors can be sliding doors or hinged doors that swing. Since shower doors are exposed to considerable moisture, corrosion can become a problem, thus shower doors are usually constructed of aluminum, and have clear glass, acrylic or tempered glass panels. Shower doors can come in many different hardware finishes and glass patterns that can match other bathroom hardware, such as the faucets and shower heads.

While shower curtains are relatively easy to install, and especially so with spring loaded compression rods extending between and supported by opposing walls, a shower door assembly is usually of a more permanent installation. A shower door installation typically requires the mounting of channels and frames to both walls and to the top rim of either a bathtub or a shower pan. However, there is a lack of shower door assemblies that are easy to install, can be easily removed and do not require the permanent mounting of components of the shower door assembly to walls, and other permanent bathroom structures.

Therefore, there is a long felt, but as of yet unmet, need for a shower door and railing assembly that can be installed as easily as a shower curtain, and that is readily removable.

SUMMARY OF THE INVENTION

The present disclosure is generally directed to a shower door and rail assembly that satisfies the need for easily installed and easily removed sliding shower doors. The present shower door and rail assembly includes a rail subassembly having a horizontally-oriented and longitudinally-extending length of rail, end caps disposed over opposite ends of the length of rail, and end pieces in threading engagement with the end caps to facilitate longitudinal adjustment along the rail subassembly to facilitate compressive installation of the rail subassembly between a pair of opposed bathroom side walls. The rail length may incorporate a pair of parallel, spaced-apart, channels provided in a bottom portion of the rail and extending longitudinally along the rail, wherein each channel is at least partially defined by a pair of opposing shoulders for supporting carriage subassembly rollers. Preferably, at least two carriage subassemblies are provided for being received within each T-track for slidable movement along the shoulders. A shower door is secured to, and hangs downwardly from, upper frame elements carried by each pair of carriage subassemblies.

In another aspect, each carriage subassembly may include a carriage body having at least one pair of rollers rotationally mounted on opposite sides thereof, the rollers bearing upon the T-track shoulders.

In still another aspect, the carriage subassembly further includes a head receptacle depending downwardly from a bottom portion thereof.

In yet another aspect, the door-supporting upper frame element defines an upper channel for receiving at least one door retainer therein, each door retainer slidably movable along a length of the upper channel.

In a still further aspect, each door retainer includes a retainer head atop a retainer neck extending upwardly from a door retainer body, wherein each retainer head is sized and shaped for being slidably received in one of the corresponding retainer head receiving portions, alternatively referred to as retainer head receptacles.

In another aspect, the head receptacle defines a retaining slot that receives the retainer neck.

In another aspect, an opening of the retainer slot is slightly smaller than a cross-sectional diameter of the retainer neck for snugly receiving the retainer neck therein.

In a still further aspect, the rail subassembly includes a pair of end caps, each having a skirt defining a receptacle at one end thereof, such that the skirt may be sleeved over one of the corresponding opposite ends of the rail length. Each end cap also includes a central threaded aperture extending into an opposite end thereof.

In yet another aspect, a pair of rotatably-adjustable end pieces is provided for enabling the rail assembly to be secured, via compression fit, between a pair of opposing side walls of a bathroom. Each end piece may include a first flanged end having a central threaded stud extending therefrom, wherein the threaded stud is sized, shaped and otherwise configured, for threading engagement with the central threaded aperture of a corresponding one of the end caps.

In another aspect, each end piece may incorporate a resilient insert disposed upon an exterior-facing side (i.e. opposite the side of the flanged end from which the threaded stud extends) of the flanged end of the end piece for bearing against, and providing frictional engagement with, a side wall of a bathroom-wall.

In accordance with a further implementation, the rail length may incorporate a pair of parallel, spaced-apart longitudinally-extending T-track channels provided in a bottom portion of the rail, wherein each T-track is at least partially defined by a pair of opposing shoulders for supporting carriage subassembly rollers. Preferably, at least two carriage subassemblies are provided for being received within each T-track for slidable movement along the shoulders. A shower door is secured to, and hangs downwardly from, upper frame elements carried by each pair of carriage subassemblies. Each carriage subassembly includes a carriage body having at least one roller rotatably mounted on each side thereof, the rollers bearing upon the T-track shoulders. The carriage subassembly further includes a door retainer head-receiving portion, or head-receiving receptacle, depending downwardly from a bottom portion of a carriage body. A shower door is attached to and hangs down from each carriage subassembly. In this implementation, a rail subassembly is provided that includes a uniform diameter cylindrical end cap having a threaded stud extending outwardly from a skirted end for being threaded into a corresponding longitudinally-extending threaded central aperture of the shower rail. Furthermore, a recess is provided in an opposite end of the end cap for receiving a resilient friction-enhancing end piece therein, the end piece incorporating resilient friction-enhancing surface features for enhancing the compression fit of the rail subassembly between a pair of posing bathroom side walls.

In an aspect, the end cap of the alternate implementation of the invention is configured for being rotationally-secured to an end of the rail such that a skirted portion of the end cap is snugly received over an end portion of the rail and rotation of the end cap enables a compression fit of the longitudinally-adjustable rail subassembly between a pair of opposing bathroom side walls.

In another aspect, a main track body is defined by a vertically-disposed rear side wall, a horizontally-disposed bottom wall extending outwardly from a lower end of the rear side wall and terminating at a leading edge and a plurality of spaced-apart tabs extend upwardly from the leading edge.

In another aspect, a pair of end caps are disposed over the opposite ends of said main track body, wherein the lower door retaining track subassembly slidably retains a lower end portion of the at least one rigid door panel therein.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG.

1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
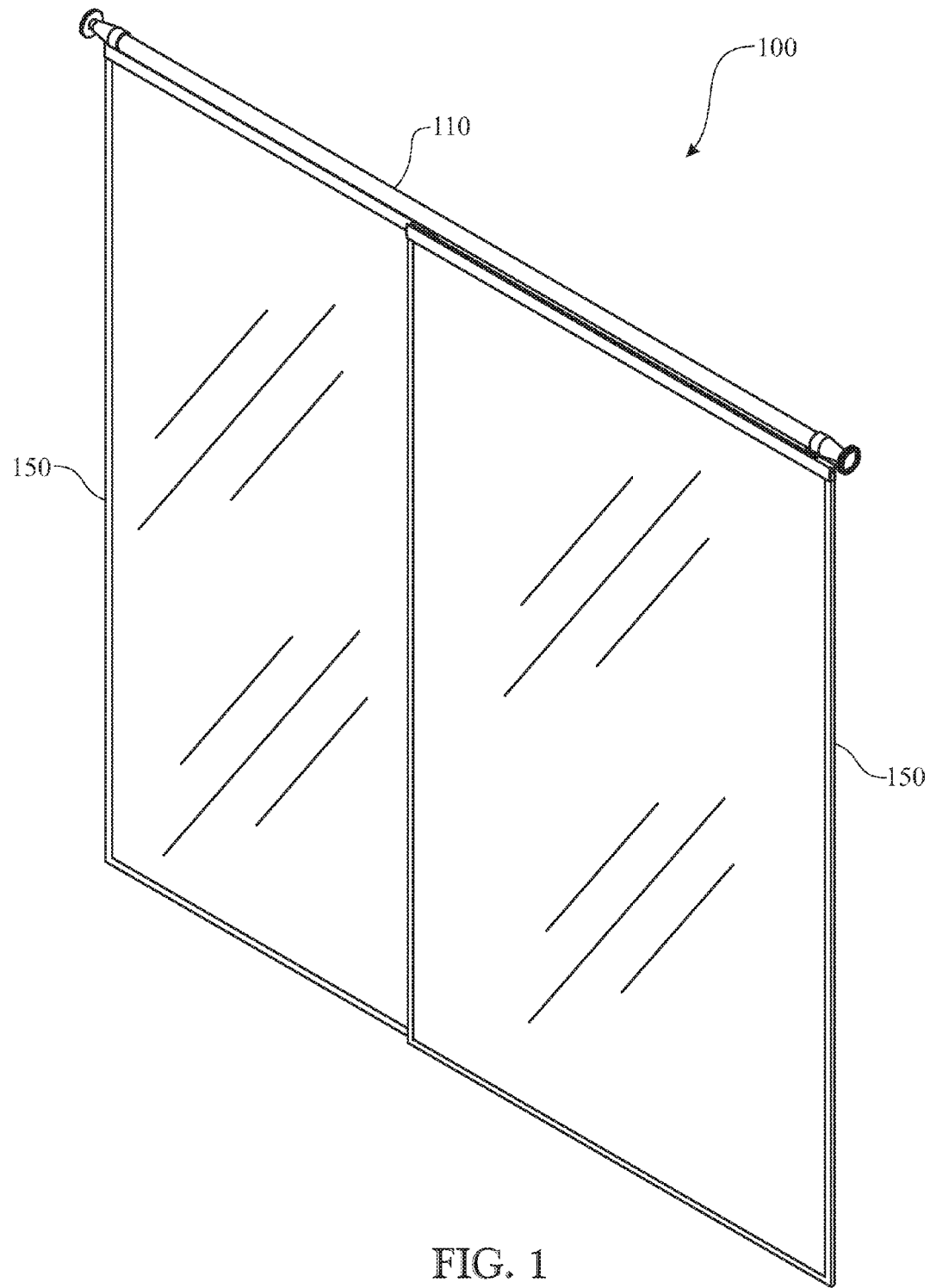
FIG. 1 presents a perspective view of a shower door and rail assembly embodying the present invention, wherein a rail subassembly slidingly supports two shower doors.
Figure 2:
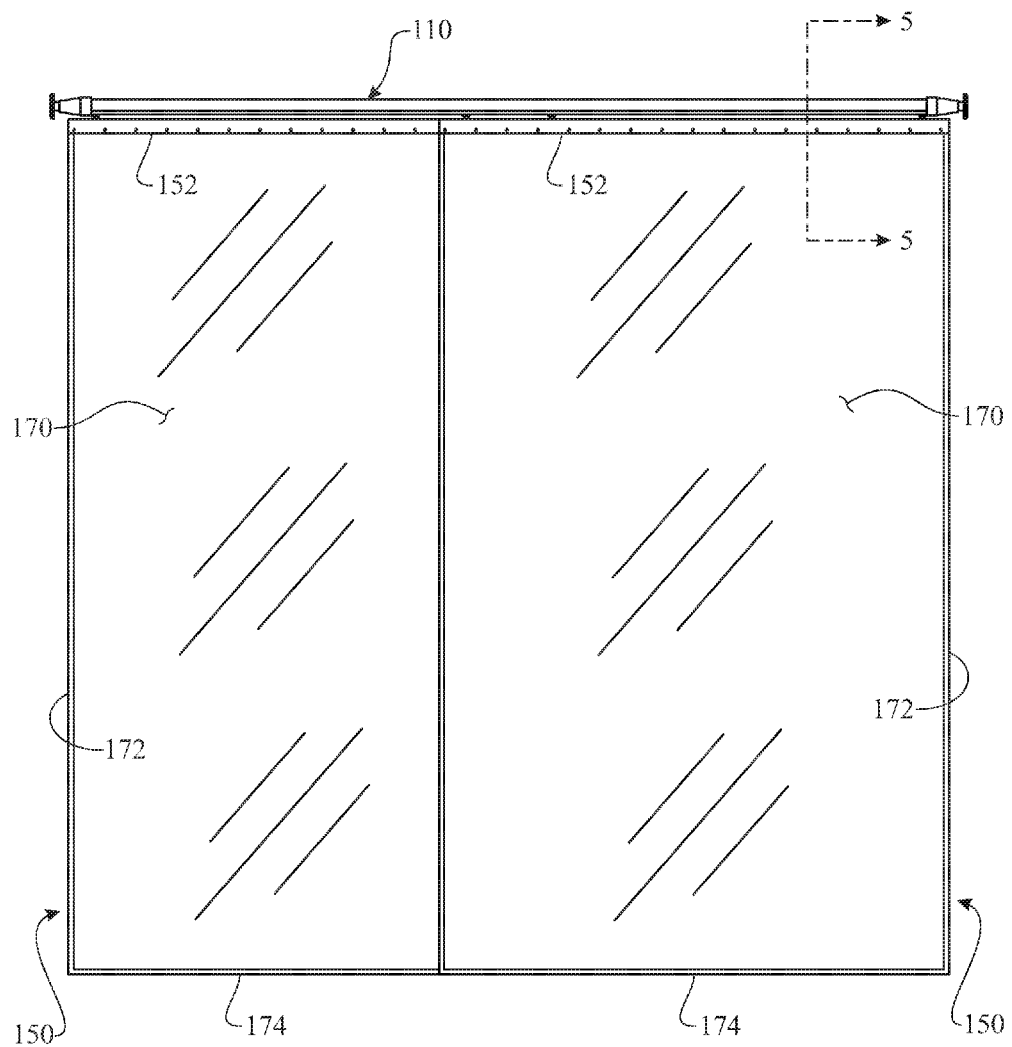
FIG. 2 presents a front elevation view of the shower door and rail assembly introduced in FIG. 1.

In one exemplary implementation of the invention, a shower door and rail assembly, identified generally as reference numeral 100, is shown in FIGS. 1-2. As shown, the shower door and rail assembly 100 includes a rail subassembly 110 having two shower door subassemblies 150 slidably coupled thereto. Each shower door subassembly 150 includes a central rigid panel 170 secured, at an upper edge portion thereof, in an upper frame element 152. The shower door subassembly 150 may include side frame elements 172 and a bottom frame element 174. Together, the side frame elements 172 and the bottom frame element 174, enclose the side and bottom edges of the rigid panel 170, shielding the edges from solid objects that may cause chipping or breakage of the rigid panel 170 and to cover potential sharp edges of the rigid shower door panel so that individuals using the shower door and rail assembly 100 are not inadvertently cut or injured by the sharp edges. The side and bottom frame elements 172 and 174, respectively, are affixed to the rigid panel 170 in a manner well known in the industry. The rigid panel 170 is preferably constructed from glass, a rigid polymer, or any other rigid panel substrate that would be suitable for use as part of a shower door.

Figure 3:
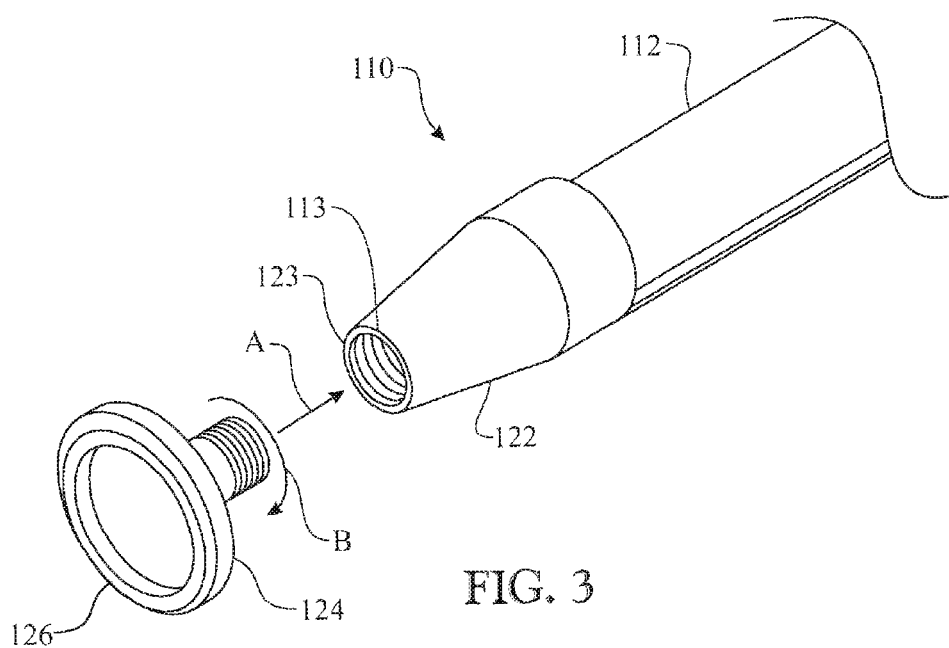
FIG. 3 presents an enlarged perspective view of an end of the shower rail subassembly with end piece 124 disengaged from end cap 122.
Figure 4:
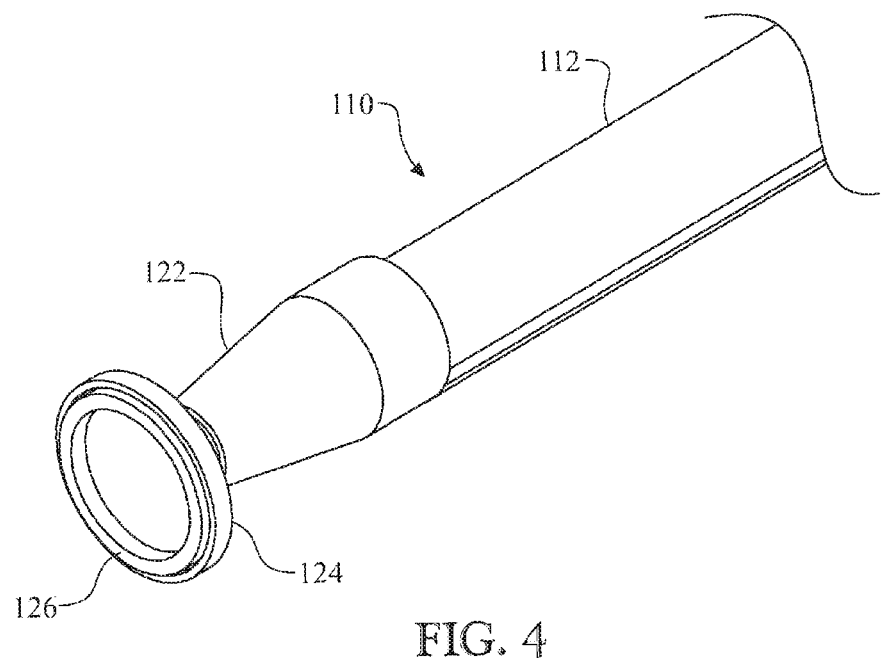
FIG. 4 presents an enlarged perspective view of the end of the shower rail subassembly with end piece 124 engaged with end cap 122.

As best shown in FIGS. 3-4, the rail subassembly 110 includes an elongated rail 112 having a length sufficient to enable the rail subassembly 110 to be installed between a pair of opposing bathroom walls, thereby extending the entire length that the shower door subassembly 150 is intended to cover. The rail 112 has, at least on one end thereof and most preferably on both ends, an end cap 122. The end cap 122 has a first end sized, shaped and otherwise configured to be snugly sleeved, or skirted, over a distal end of rail 112 to provide a frictional fit between the end cap 122 and the corresponding distal end of the rail. At an opposite second end 123, furthest away from the rail 112, a threaded aperture 113 is provided for receiving a corresponding threaded stud portion 125 of an end piece 124 therein. More precisely, as best shown in FIG. 3, the threaded stud portion 125 of end piece 124 is threadingly received into the threaded aperture 113 as indicated by arrow "A" and then rotated clockwise as indicated by arrow "B" to engage the end piece 124 with the end receptacle 122. The end piece 124 includes a resilient covering, or insert 126, for enhancing frictional engagement with the surface of a bathroom wall proximate the shower enclosure area. The end piece 124 can be rotated clockwise (as indicated by arrow "B") and counterclockwise to adjust the overall length of the rail subassembly 110 to cause the distal ends of the rail subassembly to bear against and apply pressure against opposing shower enclosure walls, thereby securely maintaining the rail subassembly 110 in position during use.

Figure 5:
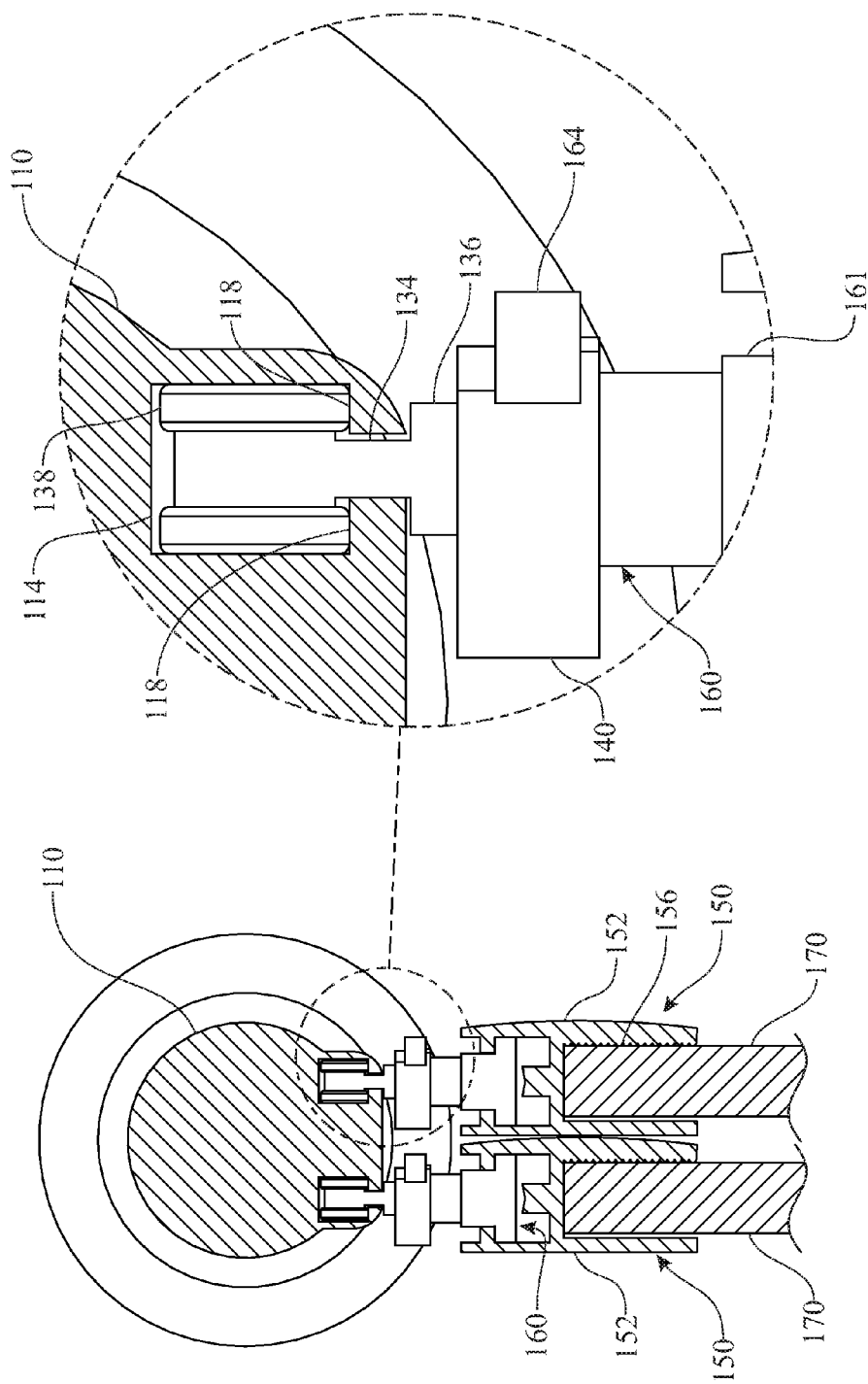
FIG. 5 presents a partial cross-sectional view of the upper portion of the shower door and rail assembly taken along the section line 5-5 of FIG. 2.
Figure 6:
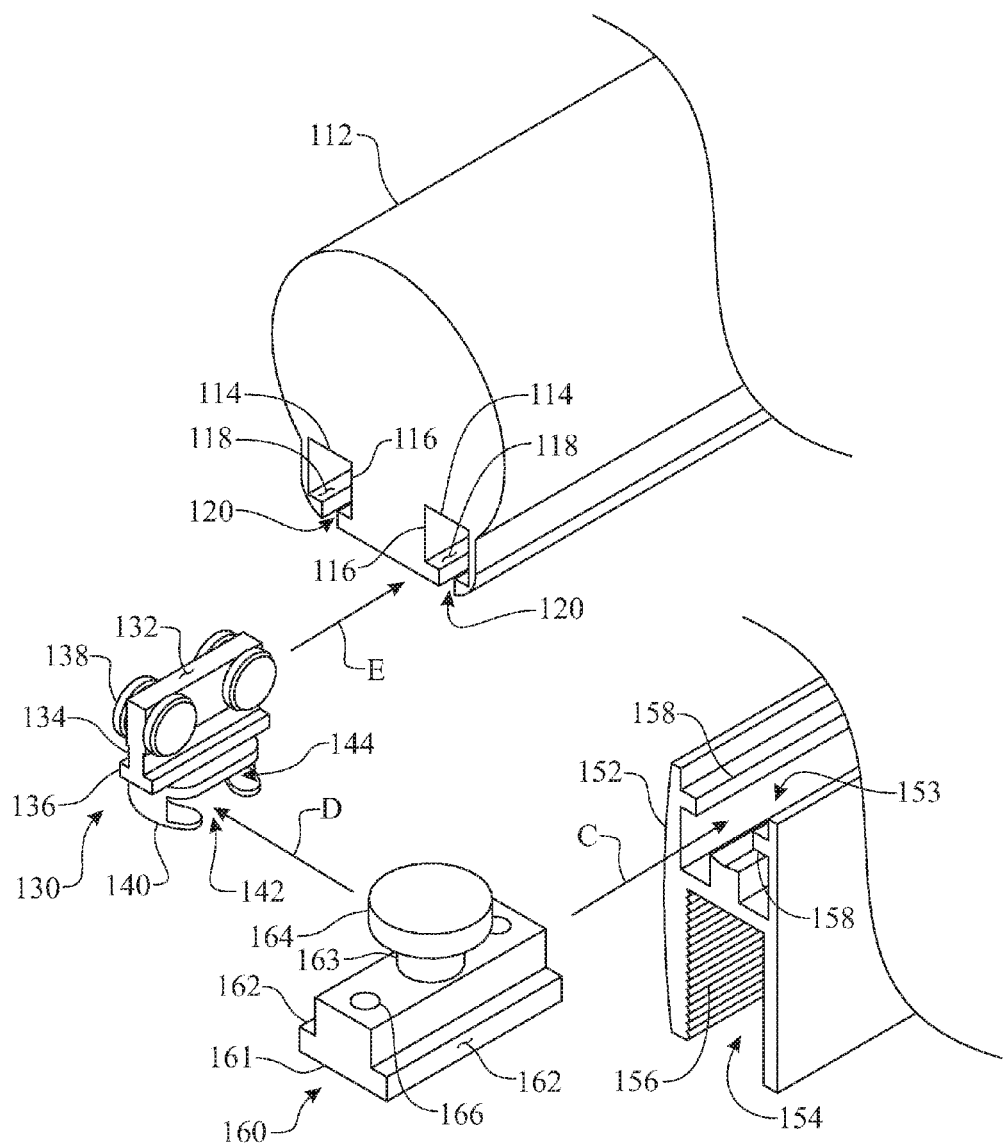
FIG. 6 presents an enlarged exploded perspective view of the rail subassembly including upper frame element 152, door retainer 160 and carriage subassembly 130.

Referring now to FIGS. 5-6, the upper frame element 152 is shown (with the rigid panel 170 removed in FIG. 6 for clarity). The upper frame element 152 defines a central door panel upper edge-receiving slot 154 for receiving the upper edge of the rigid panel 170. Preferably, at least one side of the upper edge-receiving slot 154 incorporates serrations 156 to aid with frictional gripping and retention of the rigid panel 170 therein. The upper frame element 152 also includes an upper channel 153 partially defined by a pair of opposing shoulders 158 extending horizontally, or laterally, into the upper channel 153, from corresponding opposing interior surfaces of the sides of the upper frame element 152 that define the upper channel 153, for receiving therein a door retainer body (shown generally as reference numeral 161).

A door retainer, shown generally as reference numeral 160, has a door retainer body 161 that is partially defined by a pair of door retainer body shoulders 162 extending laterally, or horizontally, outward from opposite sides of a lower portion of the retainer body 161. The retainer body 161 may also incorporate one or more vertical apertures 166 therethrough (the function of which is described herein below). A retainer neck 163 and retainer head 164 extend upwards from a top side of the retainer body 161. The retainer neck 163 and retainer head 164 can be separate components affixed to the retainer body 161, or the retainer neck 163 and retainer head 164 may be formed integrally with the retainer body 161. During assembly, the door retainer 160 is inserted into the upper channel 153 of the upper frame 152, and subsequently secured therein by a pair of set screws (not shown) extending through the corresponding vertical apertures 166. The set screws are rotated until retainer shoulders 162 bear against the underside of opposing shoulders 158 in the retainer body-receiving upper channel 153 of upper frame 152 to releasably secure the door retainer 160 to the top frame element 152.

A carriage subassembly, shown generally as reference numeral 130, is associated with each door retainer 160. The carriage subassembly 130 includes a carriage body 132 and a plurality of carriage rollers 138 rotatably mounted to an upper portion of the carriage body 132. The rollers 138 are oriented to rotate about a horizontal axis and in a direction along an axis (i.e. arrow "E", FIG. 6) substantially parallel to a longitudinal axis (i.e. arrow "A", FIG. 3) of the rail 112 of rail subassembly 110. The carriage body 130 is preferably a unitary structure having a geometry at least partially defined by a carriage neck 134 provided between an upper portion 131 and a lower base portion 136 of the carriage body 132. In the most preferred embodiment, and as best illustrated by FIG. 6, each carriage subassembly 130 includes four rollers 138, two on each lateral side of the upper portion 131 of the carriage body 132. A head receptacle 140 is provided depending downwardly from a bottom of lower base portion 136 of the carriage body 132 and defines a door retainer head-receiving portion 144 and a laterally oriented slot 142 therein. The retainer head-receiving portion 144 is sized and shaped to snugly receive, and retain therein, the retainer head 164 of the door retainer 160, and the slot 142 is likewise sized and shaped to receive the retainer neck 163 therethrough. The laterally-oriented slot 142 of the head receptacle 140 can be formed, or otherwise constructed, such that the opening of the slot 142 is nominally smaller than the diameter of the retainer neck 163, thereby securely retaining the retainer neck 163 within the head receptacle 140. In other words, the head receptacle 140 is constructed to have some resilience, such that the opening to the slot 142 has enough give to allow the retainer neck 142 to be squeezed therethrough.

The rail 112 of the rail assembly 110 includes, as most clearly shown in FIG. 6, two spaced-apart, parallel T-tracks 114 provided in a bottom portion of the rail 112. Each of the T-tracks 114 includes an upper track portion 116 having a cross-sectional form sufficient to receive the upper portion of the carriage body 132 (with the rollers 138 rotatably mounted) therein. The upper track portion 116 is partially defined by opposing shoulders 118 which further define a T-track slot 120.

As best illustrated in FIGS. 5-6, the shower door and rail assembly 100 may be assembled by inserting two door retainers 160 in the upper retainer body-receiving channel 153 of the upper frame element 152. A bottom portion of the upper frame element 152 defines a slot 154 configured for frictionally retaining a central door panel upper edge therein. Each door retainer 160 is preferably positioned proximate to an opposite end of the upper frame element 152, and may be subsequently secured in place with set screws (not shown) as previously described hereinabove. Further, a pair of carriage subassemblies 130 are inserted into each of the T-tracks 114 extending longitudinally through a bottom portion of the rail 112. The upper portion 131 of each carriage body 132, along with the carriage rollers 138, are received into the upper portion 116 of a single T-track 114, such that the rollers 138 bear downwardly on, and roll freely upon, the opposing shoulders 118 defining the T-track slot 120. The T-track slot 120 receives the carriage neck 134 and serves to guide and center the upper portion 131 of carriage body 132 and the corresponding carriage rollers 138 within the upper track portion 116 of the corresponding carriage assembly. Each retainer head 164 is inserted into a corresponding retainer head-receiving portion 144 of a head receptacle 140 depending downwardly from the lower base portion 136 of the carriage body 132 by inserting the corresponding carriage neck 134 through the retainer slot 142.

To install the shower door and rail assembly 100 for use with a shower enclosure, or a bathtub area within a bathroom, a pair of the carriage subassemblies 130 is inserted into each of the corresponding pair of T-tracks 114 in the bottom of the rail 112. The end caps 122 are subsequently skirted over corresponding opposite distal ends of the rail 112, and a threaded stud portion 125 of an end piece 124 threaded into the threaded aperture 113 extending into the opposite distal end 123 of each end cap 122. The rail subassembly 110 is then horizontally positioned between opposing walls of the enclosure surrounding the shower or bathtub (not shown) and the end pieces 124 are rotated—either clockwise or counterclockwise depending upon the threading (e.g. see arrow "B", FIG. 3)—to translate the rotatably-adjustable end pieces 124 outwardly along the longitudinal central axis of the rail subassembly 110 in order to compress the resilient covering or insert 126 against the corresponding one of the opposed bathroom side walls until the frictional engagement of the resilient coverings/inserts 126 against the opposed bathroom side walls is sufficient to provide adequate positional support of the rail subassembly 110 with respect to the shower or bathtub. Subsequently, a first one of the shower door subassemblies 150 is secured to the rail subassembly 110 via insertion of the retainer neck 163 and the retainer head 164 of the door retainer 160 (already secured to upper frame element 152 of shower door subassembly 150) through the slot 142 and into the retainer head-receiving portion 144 of each corresponding head receptacle 140. The same procedure is repeated for the second one of the pair of shower door subassemblies 150. Removal of the shower door and rail assembly 100 from the shower enclosure or bathtub is accomplished by reversing the steps for the installation.

Figure 7:
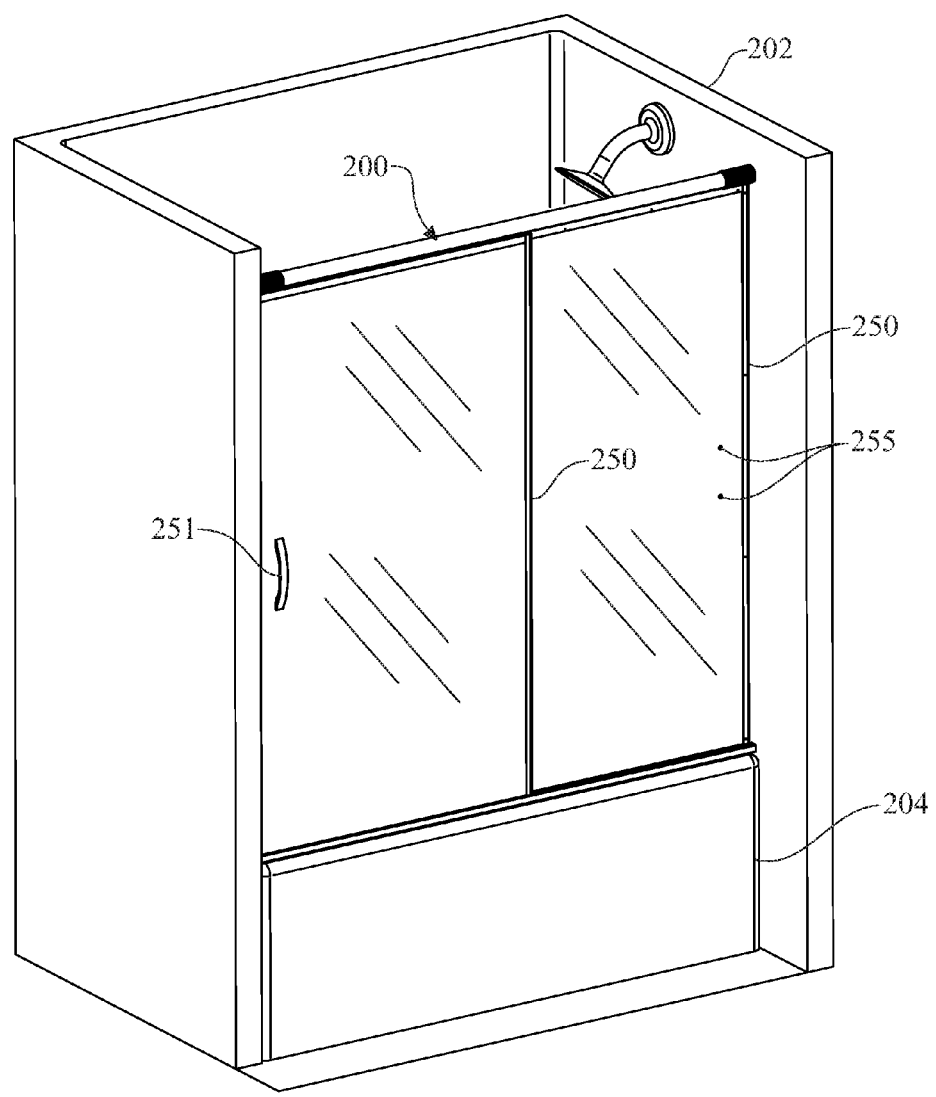
FIG. 7 presents a perspective view of an alternate implementation of the shower door and rail assembly of the present invention, shown fully installed for use within a bath enclosure.
Figure 8:
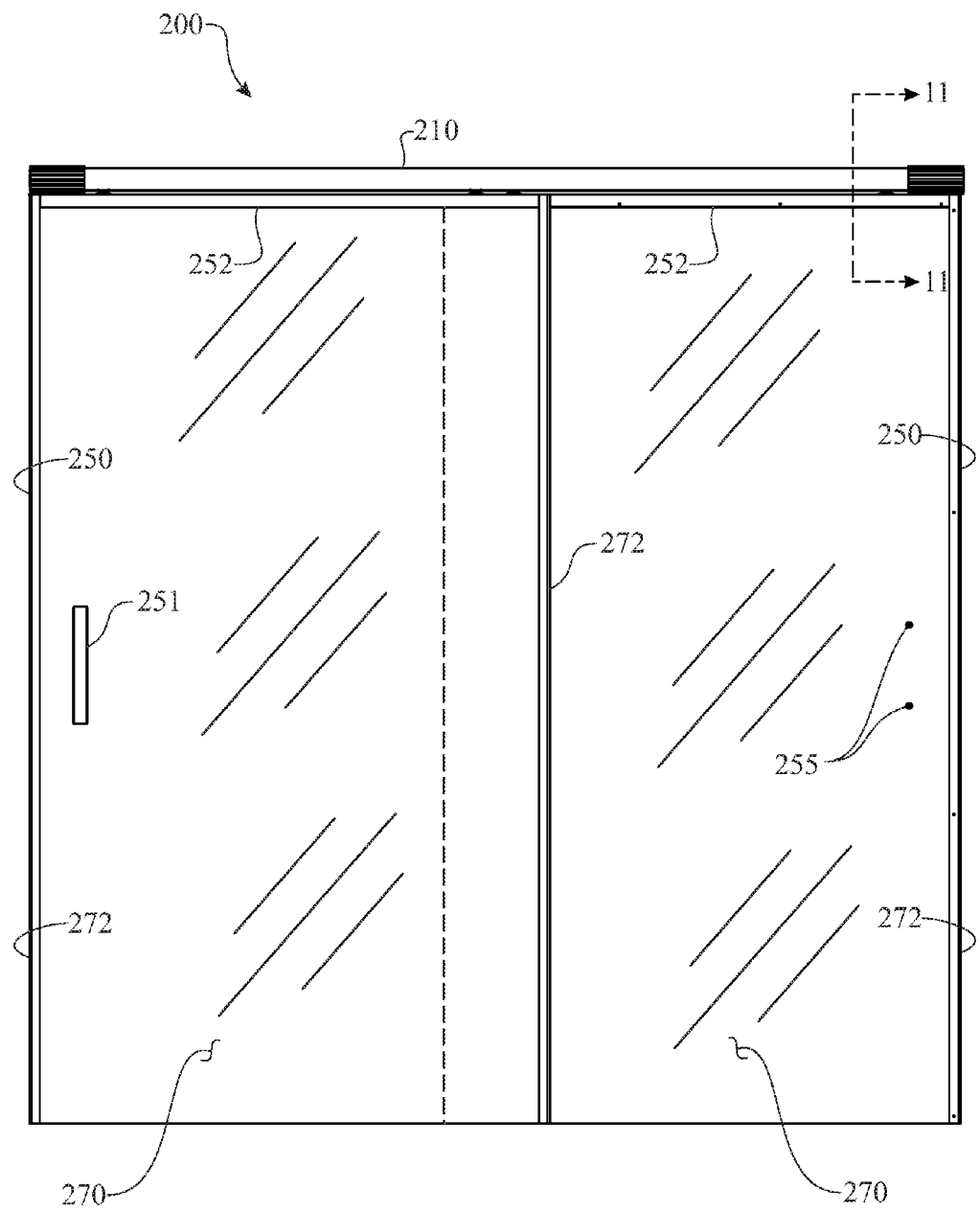
FIG. 8 presents a front elevation view of the shower door and rail assembly introduced in FIG. 7.

In accordance with an alternate implementation, a shower door and rail assembly 200 is shown in FIGS. 7-8 for use in connection with a bath enclosure 202 surrounding a bathtub 204, illustrating its various components wherein a shower door and rail assembly 200 includes a rail subassembly 210 and a pair of shower door subassemblies 250 slidably secured thereto. Each shower door subassembly 250 includes a central rigid panel 270 having an upper panel perimeter edge secured within an upper frame element 252, and a pair of opposite side panel perimeter edges secured within corresponding side frame elements 272. Together, the frame elements, 252 and 272, at least partially enclose the perimeter edges of the rigid panel 270 to shield the edges from solid objects that may cause chipping or breakage of the rigid panel 270, and to cover potentially harmful sharp edges of the rigid panel so that individuals using the shower door assembly 200 are not cut or otherwise injured during use. The side frame elements 272 are affixed to the vertical sides of the rigid panel 270 in a manner well known in the industry. The upper frame element 252 is releasably secured to the upper edge of the rigid panel 270 in the same manner as previously described hereinabove with respect to shower door and rail assembly 100. Each rigid panel 270 is preferably constructed from glass, a rigid polymer, or any other rigid panel substrate that could function in accordance with the intended use of the invention. Each rigid panel 270 may include a pair of apertures 255 proximate a vertical panel edge to facilitate the attachment of a handle 251 to aid a user during slidable opening and closing of the shower door subassembly 250.

Figure 9:
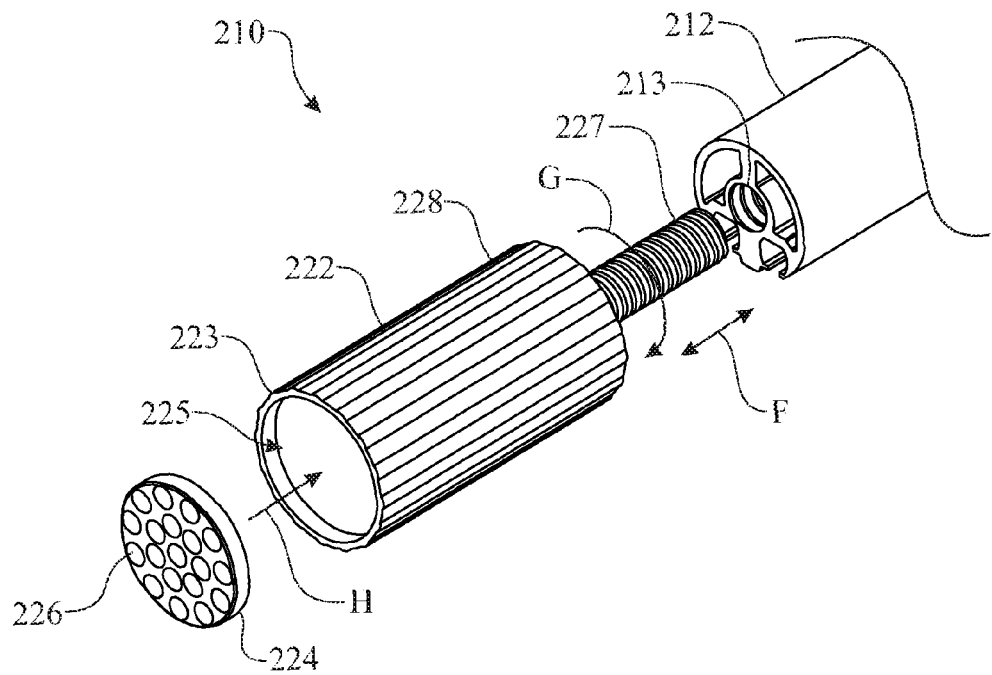
FIG. 9 presents an enlarged exploded perspective view of a distal end of a rail subassembly 210 in accordance with the alternate implementation introduced in FIG. 8.
Figure 10:
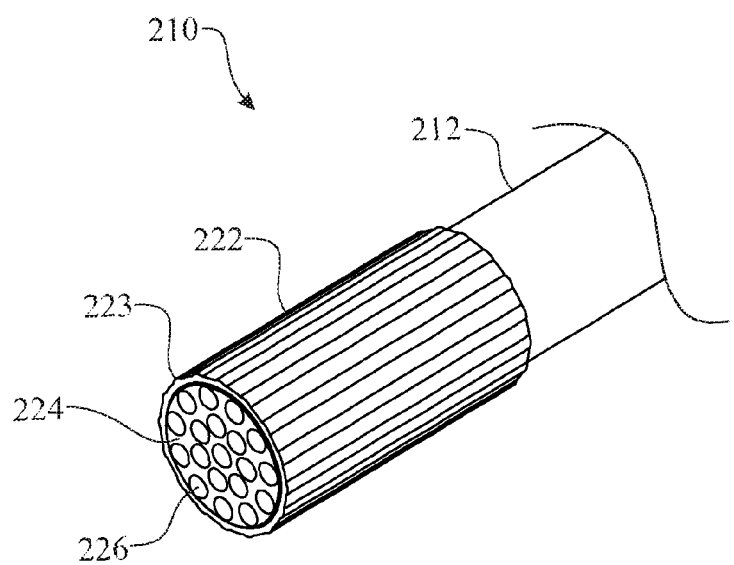
FIG. 10 presents an enlarged perspective view of the distal end of the rail subassembly of FIG. 9, shown fully assembled.

As best shown in FIGS. 9-10, the rail subassembly 210 includes an elongated rail 212 that spans almost the entire distance between the opposing bathroom walls (not shown in FIGS. 9-10) which the shower door and rail assembly 200 is intended to extend between. The rail 212 has, at least on one end thereof and most preferably on both ends, a threaded aperture 213 extending longitudinally into the rail 212 along a central axis thereof. An end cap 222 has a threaded stud 227 extending outwardly toward a distal end of elongated shower rail 212 for threading engagement with a threaded aperture 213 at the distal end of the rail 212. The threaded stud 227 of end cap 222 is translated longitudinally along a rail central axis (arrow "F") into the threaded aperture 213 and then rotated clockwise (arrow "G") to threadingly receive the threaded stud 227 into the threaded aperture 213. The end cap 222 includes a skirt portion 228 that is easily sleeved over the distal end of the rail 212 as the end cap is rotated to engage the threaded central rail aperture 213. An opposite end 223 of the end cap 222 has, at an end distal from the rail 212, a recess 225 sized, shaped and otherwise configured, for snugly receiving an end piece 224 therein. The end piece 224 is seated into the recess 225 in a direction in accordance with arrow "H" and can be retained therein by either a frictional close fit or with an adhesive interposed between an inwardly-facing side of the end piece and an exterior surface of recess 225. The end piece 224 preferably includes at least one resilient friction-enhancing surface feature 226 for enhancing frictional engagement with one of the opposing bathroom side walls defining the bath enclosure area 202. The end receptacle 222 can be rotated (arrow "G") to adjust the overall length of the rail subassembly 210, for example, to bear against and apply pressure to the opposing side walls of the bath enclosure 202 during installation.

Figure 11:
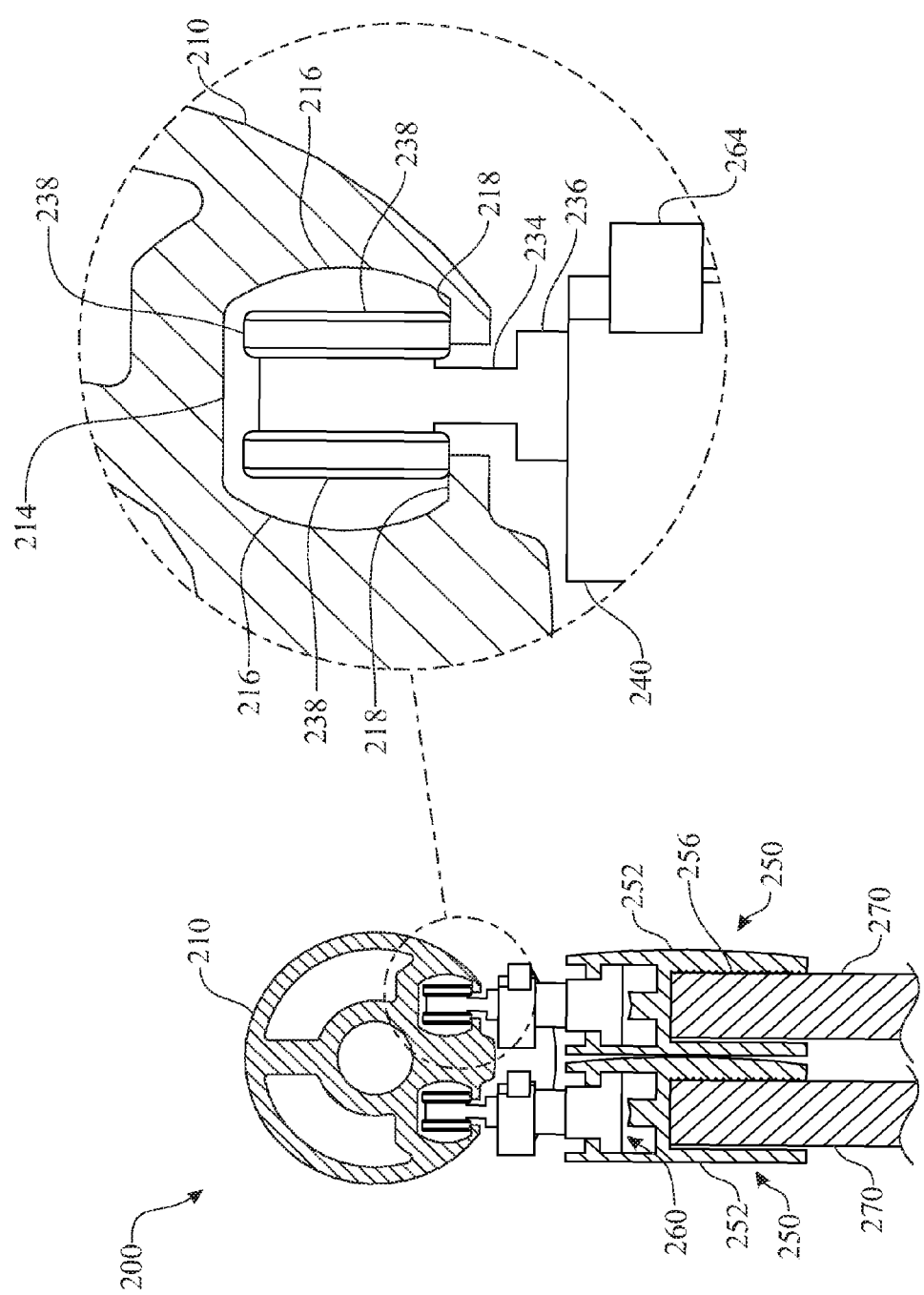
FIG. 11 presents a cross-sectional view of an upper portion of the shower door and rail assembly taken along section line 11-11 of FIG. 8.
Figure 12:
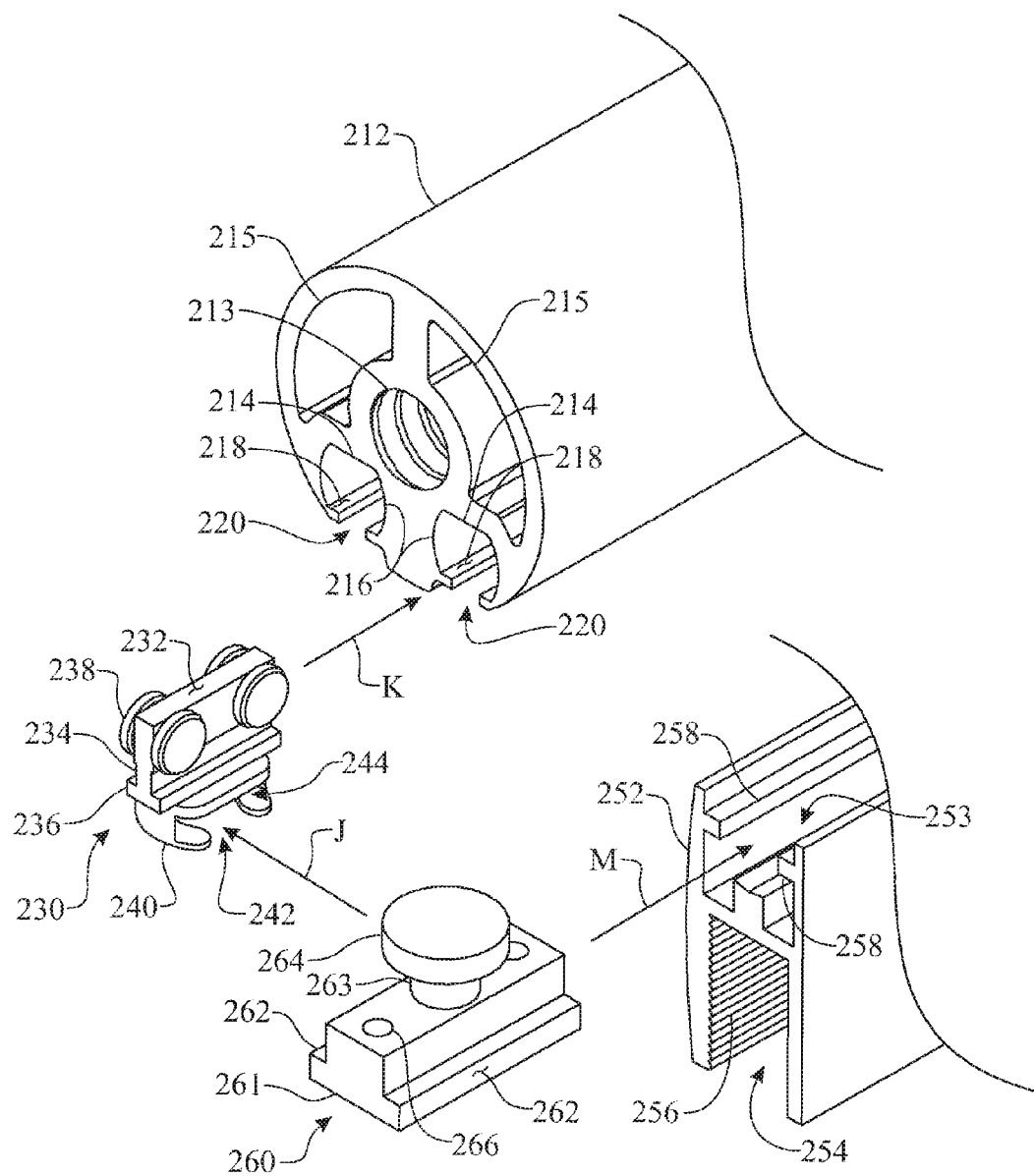
FIG. 12 presents an enlarged exploded perspective view of the distal end of a rail subassembly, including rail 212, upper frame element 252, door retainer 260 and carriage subassembly 230, in accordance with the alternate implementation of the shower door and rail assembly introduced in FIGS. 7-11.

Referring now to FIGS. 11-12, the upper frame element 252 is shown (with the rigid panel 270 removed in FIG. 11 for clarity). The upper frame element 252 includes a central door panel upper edge-receiving slot 254 for receiving the upper edge of the rigid panel 270. One or both sides of the slot 254 may be provided having serrations 256 to aid with gripping and retaining the rigid panel 270 within the slot 254. The upper frame element 252 may also include an upper receiving channel 253 and a pair of inwardly-facing opposed shoulders 258 extending into the upper-receiving channel 253 from the interior surfaces of the corresponding sides of the upper frame element 252.

A door retainer 260 includes a retainer body 261 having a pair of outwardly-extending retainer body shoulders 262 extending laterally from the retainer body 261. The retainer body 261 may incorporate one or more vertical apertures 266 therethrough for receiving a set screw (not shown) for securing the door retainer 260 within an upper channel of the upper frame element 252 in the same manner as previously described with respect to the initial implementation of the shower door and rail assembly 100. A door retainer head 264 is provided atop a retainer neck 263 extending upwards from the retainer body 261. The retainer neck 263 and retainer head 264 can be separate elements affixed to the retainer body 261, or the retainer neck 263 and retainer head 264 can be formed integrally with the retainer body 261. During assembly, the door retainer 260 is inserted in the upper receiving channel 253 of the upper frame element 252 and then secured therein by a pair of set screws (not shown) extending through corresponding vertical apertures 266. The set screws are rotated until retainer shoulders 262 bear against the underside of inwardly-facing shoulders 258 of top channel 253 of the top frame element 252, thereby securing the door retainer 260 to the top frame element 252.

A carriage subassembly 230 is associated with each door retainer 260. Each carriage subassembly 230 includes a carriage body 232 and a plurality of rollers 238 rotatably secured to an upper portion 231 of the carriage body 232. The rollers 238 are oriented to rotate about a horizontal axis and to provide movement of the carriage subassembly along an axis (i.e. arrow "K", FIG. 12) parallel to a longitudinal central axis (i.e. arrow "H", FIG. 9) of the rail 212 of rail subassembly 210. The carriage body 230 is partially defined by upper portion 231 having a first thickness transitioning to a reduced-thickness carriage neck 234 immediately below the upper portion 231 of the carriage body 232 and rollers 238. As best shown in FIG. 12, each carriage subassembly 230 preferably includes four rollers 238, two on each lateral side of the upper portion 231 of the carriage body 232. A head receptacle 240 depends downwardly from a bottom of the carriage body 232 to define a retainer head-receiving portion 244 and a laterally oriented neck-receiving slot 242 therein. The retainer head-receiving portion 244 is sized, shaped and otherwise configured, to snugly receive the retainer head 264 of the door retainer 260, while the slot 242 is likewise sized to snugly receive the retainer neck 263 therethrough during insertion of the door retainer head and neck. The slot 242 of the retainer head receiving receptacle 240 can be constructed such that the opening to the slot 242 is nominally smaller than the diameter of retainer neck 263, thereby securely receiving the retainer neck 263 through the retainer slot 242 during assembly.

The rail 212 of the rail subassembly 210 includes, in addition to threaded central aperture 213, one or more longitudinally extending internal rail channels 215 provided to conserve fabrication material, as most clearly shown in FIG. 12. The rail 212 is further defined by a pair of parallel T-tracks 214. Each of the T-tracks 214 includes an upper track portion 216 of a cross-sectional form sufficient to receive the upper portion 231 of the carriage body 232 with the rollers 238 rotatably secured thereto. The upper track portion 216 is preferably sized and shaped for receiving carriage body upper portion 231 with rollers 238, such that the rollers are aligned with an upper surface of opposing shoulders 218. Opposing side wall surfaces 217 are preferably provided having an arcuate surface contour to prevent the rollers from contacting the opposing side wall interior surfaces 217 of the upper track 216. The opposing shoulders 218 further define a slot 220 therebetween, the slot defining a gap distance slightly greater than the width of carriage body neck 234 for facilitating stable sliding movement of the carriage body neck therethrough.

As best shown in FIGS. 11-12, the shower door and rail assembly 200 may be assembled by initially inserting a pair of door retainers 260 into the upper-receiving channel 253 of the upper frame element 252. Furthermore, upper frame element 252 receives an upper edge of a corresponding rigid panel 270 within door panel upper edge-receiving slot 254. Each door retainer 260 is subsequently positioned proximate to a distal end of an upper frame element 252 and secured in place with set screws (not shown) as previously described hereinabove. Further, a pair of carriage subassemblies 260 are inserted into corresponding T-tracks 214 provided in the bottom of each rail 212. The upper portion 231 of each carriage body 232 with attached rollers 238 is received in an upper track portion 216 such that the rollers 238 bear downwardly on, and roll freely upon, the corresponding opposing shoulders 218 defining slot 220. Each slot 220 is sized for receiving the carriage neck 234 therethrough and serves to guide and center the upper portion 231 of carriage body 232 and rollers 238 within the upper track 216. Each door retainer head 264 is inserted into a corresponding retainer head receiving portion 244 of a head receptacle 240 depending downwardly from a bottom of a carriage body 232, with a carriage neck 263 received through a corresponding retainer slot 242 during insertion.

To install the shower door assembly 200 for use with a bath enclosure area 202, a pair of carriage subassemblies 230 are inserted into each of the two T-tracks 214 provided in the bottom of the rail 212. Subsequently, end caps 222 are threaded into respective opposite ends of the rail 212. The rail subassembly 210 is then positioned between opposing walls 202a, 202b of the bath enclosure area 202 surrounding the bathtub 204, and the end caps 222 are rotated (e.g. arrow "G", FIG. 9) to compress the resilient friction-enhancing surfaces 226 of end pieces 224 against the corresponding opposing wall surfaces, 202a and 202b, to thereby frictionally support the rail subassembly 210 therebetween. Subsequently, a first one of the shower door subassemblies 250 is releasably secured to a shower rail subassembly 210 by inserting the retainer neck 263 and the retainer head 264 of the door retainer 260 (already affixed to upper frame element 252 of shower door subassembly 250) past the slot 242 and into retainer head-receiving portion 244 of each head-receiving receptacle 240, respectively. The procedure is repeated for the second one of the shower door subassemblies 250. Removal of the shower door and rail assembly 200 from the shower enclosure or bathtub is accomplished by reversing the above-described installation steps.

Figure 13:
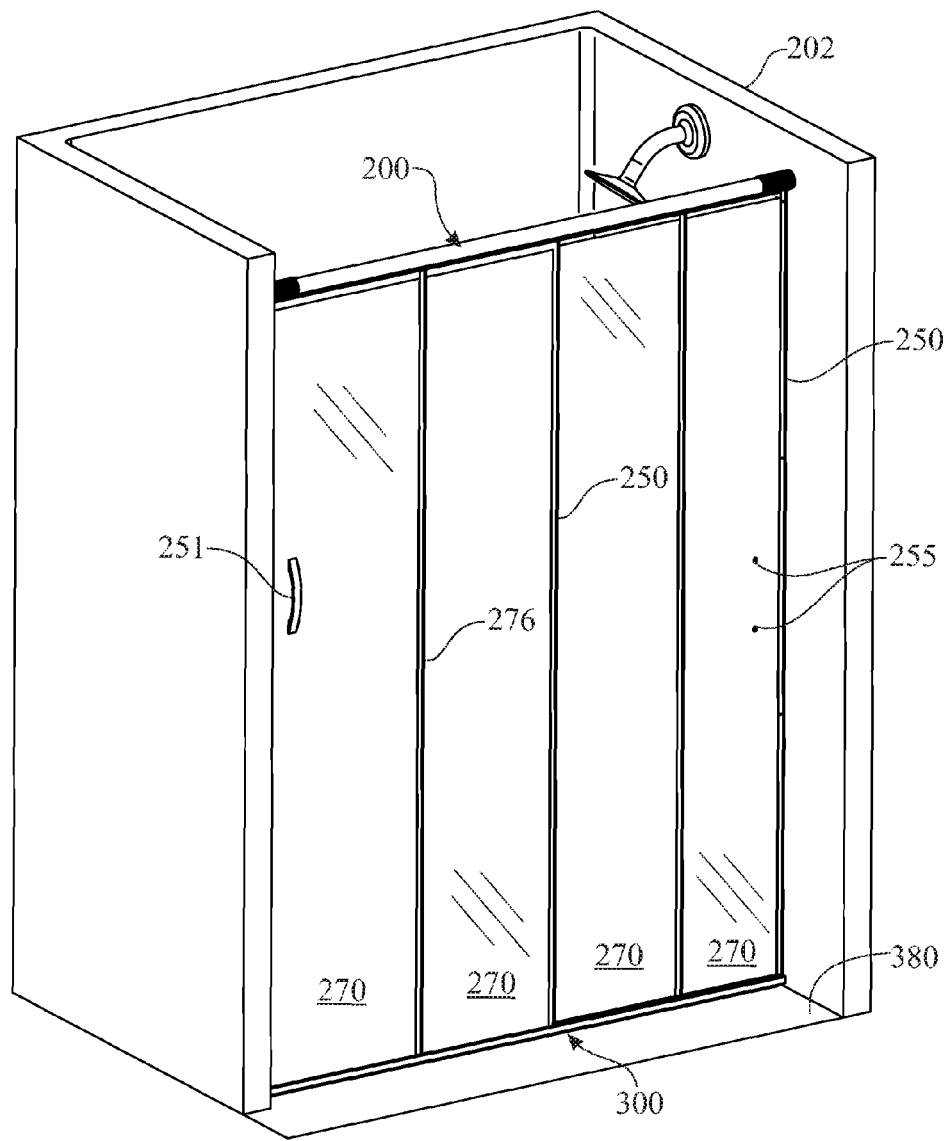
FIG. 13 presents a perspective view of an alternate implementation of the shower door and rail subassembly of the present invention, shown fully installed for use within a bath enclosure.
Figure 14:
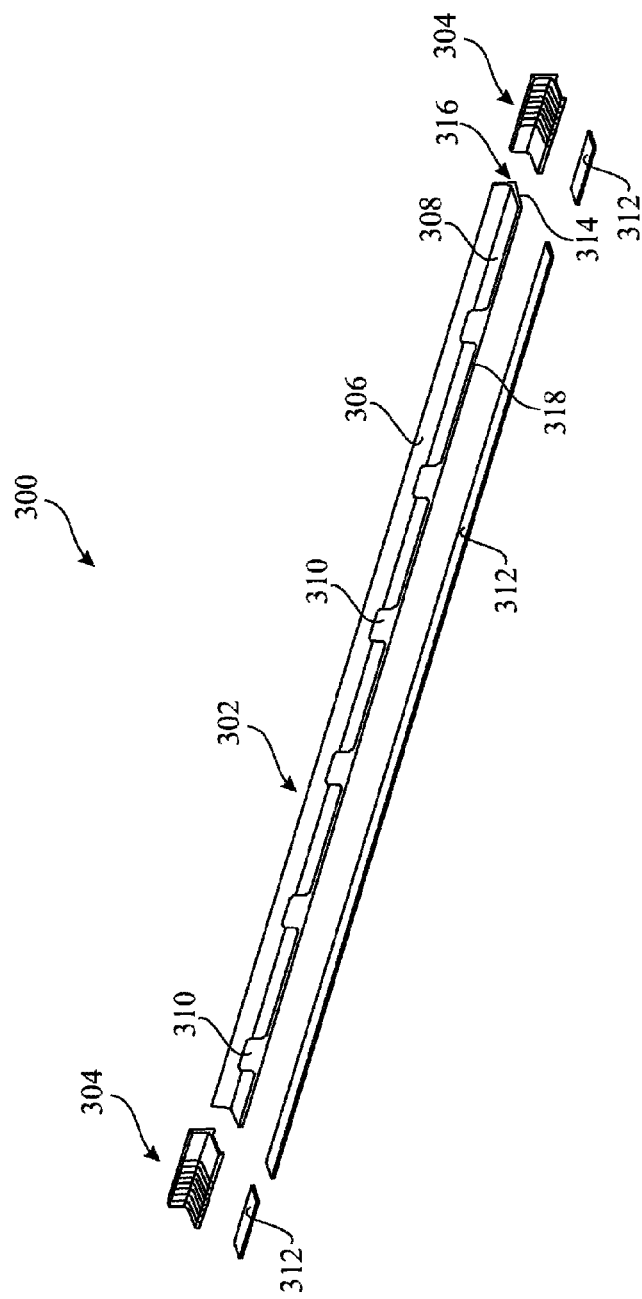
FIG. 14 presents a perspective view of the base component used in the alternate embodiment of the shower door and rail subassembly shown on FIG. 13.

In accordance with an alternate implementation, a shower door and rail assembly 200 is shown in FIGS. 9, 13 thru 14, for use in connection with a bath enclosure 202, illustrating its various components wherein a shower door and rail assembly 200 includes a rail subassembly 210 and a pair of shower door subassemblies 250 slidably secured thereto. The shower door subassembly 250 includes a plurality of door panels 270 positioned adjacent one another and coupled with a gasket 276 that extends the entire length of each door panel 270, so as to provide at least one complete (sealed) rigid panel. Each of the door panels 270 may include an upper panel perimeter edge secured within an upper frame element 252 (shown on FIG. 12), and a pair of opposite side panel perimeter edges secured within corresponding side frame elements 272. Together, the frame elements 252 and 272, at least partially enclose the perimeter edges of the outer rigid panels 270 to shield the edges from solid objects that may cause chipping or breakage of the rigid panels 270, and to cover potentially harmful sharp edges of the rigid panel so that individuals using the shower door assembly 200 are not cut or otherwise injured during use. The side frame elements 272 are affixed to the vertical sides of the outer rigid panels 270 close to the walls in a manner well known in the industry. The upper frame element 252 is releasably secured to each of the upper edge of the rigid panels 270 in the same manner as previously described hereinabove with respect to shower door and rail assembly 100. Each rigid panel 270 is preferably constructed from glass, a rigid polymer, or any other rigid panel substrate that could function in accordance with the intended use of the invention. Each rigid panel 270 may include a pair of apertures 255 proximate a vertical panel edge to facilitate the attachment of a handle 251 to aid a user during slidable opening and closing of the shower door subassembly 250.

As best shown on FIGS. 13 and 14, the shower door assembly generally includes a lower door retaining track subassembly 300. The lower door retaining track subassembly 300 includes a track main body 302 defined by a vertically-disposed rear side wall 306 adjoined and contiguous with a horizontally-disposed bottom wall 308 that extends outwardly from a lower end 316 of the rear side wall and terminates at a leading edge 318. Generally, a plurality of spaced-apart tabs 310 extend upwardly from the horizontally-disposed bottom wall's 308 leading edge 318. Disposed over the opposite ends of the track main body 302 are a pair of end caps 304 generally made out of a flexible material, such as rubber. Although the bottommost portion of the rigid panels 270 do not slide or otherwise engage the horizontally-disposed bottom wall 308 of the lower door retaining track subassembly 300, both the laterally spaced-apart tab members 310 and vertically-disposed rear 308 are formed and otherwise configured to retain each rigid panel 270 within the provided U-shaped channel, so as to prevent torsional damage to the door panels affixed to the carriage and upper frame subassembly. The main track body may include an adhesive strip 312 applied to the lower surface 314 of the horizontally-disposed bottom wall 308 and end caps 304 in order to selectively secure the main track body 302 to a surface 380. When affixed, the base subassembly 300 is vertically off-set but otherwise perfectly aligned with the rail assembly 200.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A shower door and rail assembly for removable installation between a pair of opposing bathroom side walls, the shower door and rail assembly comprising:
    a rail subassembly, including
        a rail length having first and second opposite ends and at least one channel provided in a bottom portion of said rail length and extending longitudinally along said rail, said at least one channel at least partially defined by a pair of opposing shoulders, the opposing shoulders further defining a channel upper portion and a track slot;
        a pair of end caps disposed over said first and second opposite ends of said rail length; and,
        a pair of end pieces selectively attachable to said respective pair of end caps; and,
    a shower door subassembly, including
        at least one rigid door panel having an upper edge;
        an upper frame element having a door panel upper edge-receiving slot provided in a bottom portion thereof for retaining the upper edge of said at least one door panel therein, and an upper channel provided along a top portion of the upper frame element partially defined by a pair of opposing shoulders;
        at least one door retainer having a retainer body, a retainer neck extending upwards from said retainer body, and a retainer head extending upwards from said retainer neck, said retainer body having door retainer body shoulders extending laterally outwards therefrom, said door retainer received and retained within the upper channel of said upper frame element;
        a carriage subassembly having a carriage body, at least one pair of axially-aligned rollers extending outward from opposite lateral sides of said carriage body, and a head receptacle depending downwardly from a lower base portion of said carriage body, the head receptacle having a door retainer head-receiving portion and a laterally-oriented slot, said door retainer head received and retained within said retainer head-receiving portion, and
    a lower door retaining track subassembly, including
        a main track body defined by a vertically-disposed rear side wall, a horizontally-disposed bottom wall extending outwardly from a lower end of said rear side wall and terminating at a leading edge, and a plurality of spaced-apart tabs extending upwardly from said leading edge, said main track body extending between opposite ends; and
        a pair of end caps disposed over said opposite ends of said main track body, said lower door retaining track subassembly slidably retaining a lower end portion of said at least one rigid door panel therein.

2. A shower door and rail assembly as recited in claim 1, wherein said carriage subassembly with said door retainer coupled thereto facilitates sliding of said upper frame element, and said at least one door panel secured to said upper frame element, via linear translation of said carriage subassembly along said at least one rail channel between said rail end caps.

3. A shower door and rail assembly as recited in claim 1, wherein said at least one rigid door panel is coupled to a second rigid door panel.

4. A shower door and rail assembly as recited in claim 1, wherein each one of said at least one carriage subassembly includes a carriage body having at least one roller rotationally mounted on an opposite side thereof, said rollers bearing upon said opposing shoulders of said longitudinal-extending upper channel.

5. The shower door assembly according to claim 4, wherein each of said at least two door retainer head-receiving receptacles includes a retainer head above a retainer neck, each of said retainer head being slidably received in one of said at least two door retainer head-receiving receptacles.

6. The shower door assembly according to claim 5, wherein said head-receiving receptacle defines a retainer slot, said retainer slot receiving said retainer neck.

7. The shower door assembly according to claim 6, wherein an opening of said retainer slot is slightly smaller than a cross-sectional diameter of said retainer neck for snugly receiving said retainer neck therein.

8. The shower door assembly according to claim 1, wherein said rail subassembly includes a pair of end caps each having a skirt defining a receptacle at a corresponding end thereof, each said skirt sleeved over a corresponding end of said rail, said pair of end caps having a central threaded aperture extending into an opposite end of said pair of end caps, and a pair of rotatably-adjustable end pieces provided for enabling securement of said rail subassembly in said threaded pair of end caps, wherein said pair of end caps are rotatable therein for adjusting the length of said rail subassembly.

9. The shower door assembly according to claim 8, wherein said pair of rotatably-adjustable end pieces include a resilient insert at an end thereof distal from said rail subassembly for frictional engagement of a wall surface of a bath enclosure.

10. The shower door assembly according to claim 1, wherein said rail subassembly includes a pair of end caps having a central threaded aperture, said rail subassembly further includes an end piece having a first flanged end and a central threaded stud extending therefrom, said central threaded stud is rotationally engaged in said central threaded aperture and wherein said end piece includes a skirt that is rotatably sleeved over an end of said rail subassembly.

11. The shower door assembly according to claim 10, wherein said end piece includes a resilient insert at an end thereof distal from said rail subassembly for frictional engagement of a wall surface of a bath enclosure.

* * * * *